United States Patent
Sato et al.

(10) Patent No.: US 8,408,752 B2
(45) Date of Patent: Apr. 2, 2013

(54) SURFACE LIGHTING UNIT, SURFACE LIGHTING LIGHT SOURCE DEVICE, SURFACE LIGHTING DEVICE

(75) Inventors: Eiichi Sato, Hachioji (JP); Kenji Fukuoka, Hachioji (JP)

(73) Assignee: Opto Design, Inc. (JP)

( * ) Notice: Subject to any disclaimer, the term of this patent is extended or adjusted under 35 U.S.C. 154(b) by 398 days.

(21) Appl. No.: 12/739,359

(22) PCT Filed: Jul. 17, 2008

(86) PCT No.: PCT/JP2008/001921
§ 371 (c)(1),
(2), (4) Date: Apr. 22, 2010

(87) PCT Pub. No.: WO2009/054083
PCT Pub. Date: Apr. 30, 2009

(65) Prior Publication Data
US 2010/0232165 A1    Sep. 16, 2010

(30) Foreign Application Priority Data
Oct. 26, 2007 (JP) .................... 2007-278998

(51) Int. Cl.
*F21V 7/00* (2006.01)
(52) U.S. Cl. ............. 362/303; 362/241; 362/249.02
(58) Field of Classification Search ............. 362/303, 362/241, 249.02
See application file for complete search history.

(56) References Cited

U.S. PATENT DOCUMENTS
2005/0280756 A1   12/2005   Kim et al.

FOREIGN PATENT DOCUMENTS

| | | |
|---|---|---|
| JP | 62-145214 U | 9/1987 |
| JP | 02-037604 A | 2/1990 |
| JP | 02-068803 A | 3/1990 |
| JP | 4-63503 U | 5/1992 |
| JP | 2002-343124 A | 11/2002 |
| JP | 2003-186427 A | 7/2003 |
| JP | 2005-284283 A | 10/2005 |
| JP | 2006-012818 A | 1/2006 |
| WO | WO-2007/034595 A1 | 3/2007 |

OTHER PUBLICATIONS

English translation of Chen JP2005284283.*
"International Application Serial No. PCT/JP2008/001921, International Search Report mailed Aug. 12, 2008", 12 pgs.

* cited by examiner

*Primary Examiner* — Mary Ellen Bowman
(74) *Attorney, Agent, or Firm* — Schwegman Lundberg & Woessner, P.A.

(57) ABSTRACT

In a surface lighting unit comprising a footprint portion, a sidewall portion, and an optical reflector with an opening spaced apart by a predetermined distance from the footprint portion. The opening substantially satisfies a relation $A = bx^2 + c$, assuming A is the open area ratio, i.e. the ratio of the opening area in a preset predetermined region to the area of the preset predetermined region, b and c are constants, and x is the distance from the center of the optical reflector. The opening has a circular non-through hole concentric to the center of the optical reflector, a concentric arcuate hole on the outside thereof, and a plurality of round holes farther on the outside thereof.

4 Claims, 10 Drawing Sheets

$$A = \frac{2\beta \cdot S}{2S \cdot \alpha} = \frac{\beta}{\alpha}$$

$$\beta = \alpha A$$

SURFACE LIGHTING UNIT, SURFACE LIGHTING LIGHT SOURCE DEVICE, SURFACE LIGHTING DEVICE

RELATED APPLICATIONS

This application is a nationalization under 35 U.S.C. 371 of PCT/JP2008/001921, filed Jul. 17, 2008, and published as WO 2009/054083 A1 on Apr. 30, 2009, which claimed priority under U.S.C. 119 to Japanese Patent Application Serial No. 2007-278998, filed Oct. 26, 2007, which applications and publication are incorporated herein by reference in their entirety.

TECHNICAL FIELD

The present invention relates to a surface lighting unit employed in a surface lighting light source device, to a surface lighting light source device, and to a surface lighting device for use in LCD backlight devices, illumination boards, and automotive or vehicle display devices, for example.

BACKGROUND ART

Use of light emitting diodes (LEDs) as light sources for display devices, lighting devices, and the like is discussed because LEDs consume less electricity and generate less heat. However, LEDs have high directionality, and thus require ingenuity in order to provide uniform light distribution on a wide plane.

For example, Patent Document 1 discloses a configuration including a light guide body having a light incident end surface on which light from a light source is incident and a light emitting surface through which the guided light is emitted. Local lens lines provided to the light guide body are formed in different directions from the direction of the peak light of the maximum strength light of the brightness distribution at the incident position of the light incident end surface, whereby unevenness in brightness is eliminated.

Patent Document 2 discloses a configuration including a lamp housing having an opening on one end and having a light source accommodation portion whose inner wall is a light reflective surface, a light emitting diode provided in the light source accommodation portion, and a display plate provided in front of the opening. Light from the light emitting diode is diffused and reflected to be uniformized.

Patent Document 3 discloses that repeated reflections on fine reflection parts in a diffusion layer provided on the radiating surface of light and on a reflector provided on the periphery of an LED provide uniform light.

Patent Document 4 discloses that directional light emitted from an LED (in particular, intense light directly above the LED) is reflected on a reflective part provided on the radiating surface back toward the LED, whereby the direction of the light is changed to decrease the light intensity from the LED and to provide uniform light.

According to Patent Document 1, the LED light source lies laterally to the radiation direction in order to equalize highly directional light emitted from the LED, which requires a large space.

Patent Document 2 requires a certain width in the radiation direction of the LED. In addition, as the fact that the light scattered by an inner diffusion film is absorbed by a base plate shows, for example, Patent Document 2 has no technological thought for using all the light emitted from the LED.

According to Patent Document 3, while the radiating surface and the footprint portion on the periphery of the LED are provided with reflective plates, the side surfaces have no reflective plates. It is therefore impossible to cause multireflection of light to use all the light emitted from the LED and provide uniform illumination light in the space surrounding the LED.

Patent Document 4 is directed to provide uniform illumination through controlling of a path along which light emitted from the LED travels, and employs the reflective part on the radiating surface to change the path of the light. This, however, reduces light intensity, and it is impossible to provide uniform light through multireflection.

Patent Document 1: Japanese Patent Application Publication No. 2002-343124
Patent Document 2: Japanese Patent Application Publication No. 2003-186427
Patent Document 3: Japanese Patent Application Publication No. 2005-284283
Patent Document 4: Japanese Patent Application Publication No. 2006-12818

DISCLOSURE OF INVENTION

An object of the present invention is to provide a surface lighting light source device and a surface lighting device that use light from a light source at high efficiency and provide uniform illumination light on a plane that is spaced apart by a certain distance from a radiating surface without increasing the width of the light in the radial direction. Another object of the present invention is to provide, for practical manufacturing, such a surface lighting light source device and a surface lighting device that can be manufactured easily.

To achieve the object, the present invention is configured as follows.

According to an aspect of the present invention, a surface lighting unit of the present invention is plurally arranged in a matrix on a single plane and includes: a box-shaped casing having a footprint portion in which a hole for placing a highly directional point-light source is formed at the center thereof and sidewall portions standing from the footprint portion; and an optical reflector spaced apart by a certain distance from the footprint portion and having openings. The surface lighting unit is used in such a manner that the point-light source is placed in the hole. Inner surfaces of the footprint portion and of the sidewall portions, and an inner surface of the optical reflector that faces the footprint portion are reflective surfaces. The optical reflector has a center thereof facing the hole. The openings are so formed that an opening ratio represented by a ratio of the area of the openings in a preset region on the optical reflector to the area of the preset region increases as a distance from the center of the optical reflector increases outward. The sidewall portions have sidewall holes formed to satisfy the opening ratio.

Preferably, the round holes are arranged in a closed-packed lattice in a plan view, and the round holes that are adjacent to the arcuate hole are arranged in a hexagon, and the arcuate hole that is farthest from the center of the optical reflector is arranged on straight lines joining the round holes corresponding to the vertexes of the hexagon and the center.

Preferably the openings are formed in a non-through hole around the center of the optical reflector, in a plurality of non-continuous arcuate holes on the outer side of the non-through hole, and in a plurality of through holes on the outer side of the arcuate holes. According to another aspect of the present invention, the surface lighting light source device according to the present invention includes the surface lighting unit and a highly directional point-light source placed in the hole.

According to still another aspect of the present invention, in a surface lighting device of the present invention, the surface lighting light source device is plurally arranged in a matrix.

The present invention uses light from the light source at high efficiency and provides uniform illumination light on a plane that is spaced apart by a certain distance from the optical reflector. Further, the present invention enables easy manufacturing for practical manufacturing.

BEST MODE(S) FOR CARRYING OUT THE INVENTION

Figure 1A:
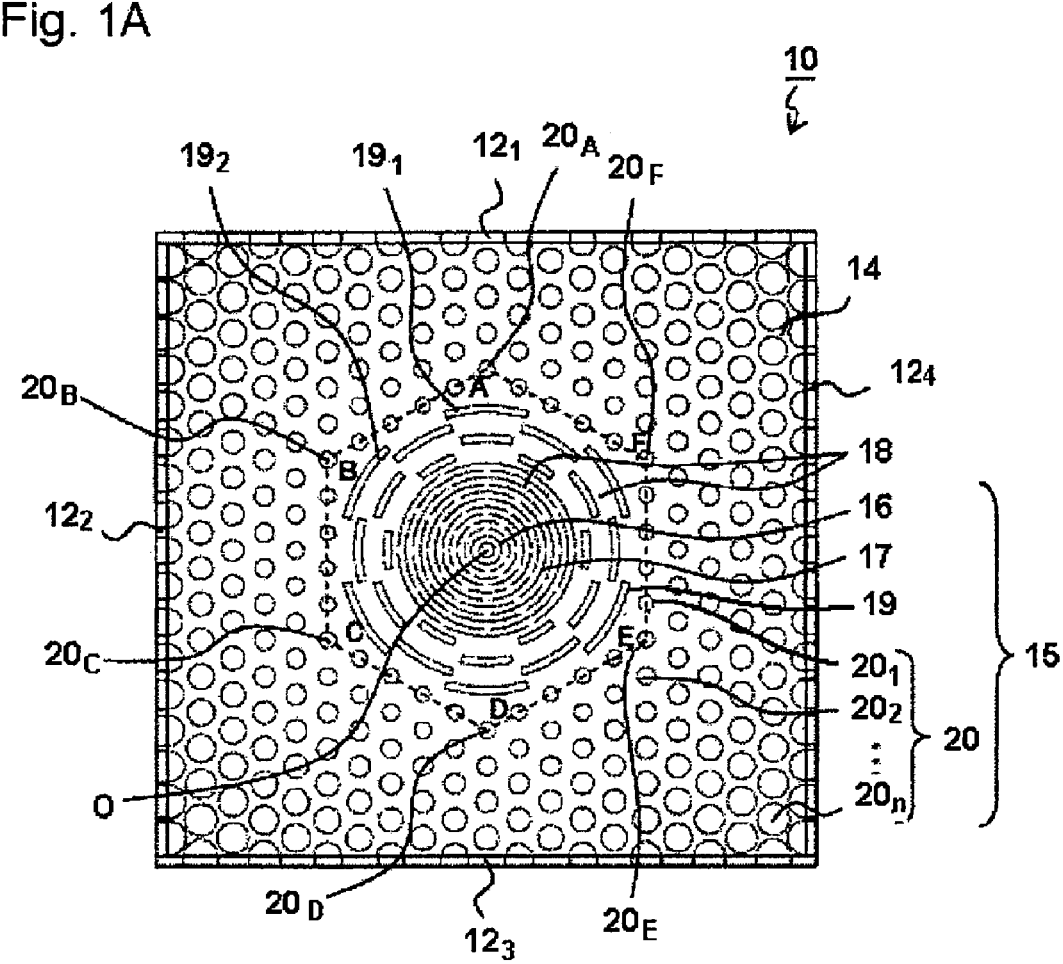
FIG. 1A is a plan view of a surface lighting unit according to a first embodiment of the present invention.

FIG. 1A is a plan view of a surface lighting unit according to an embodiment of the present invention.

Figure 1B:
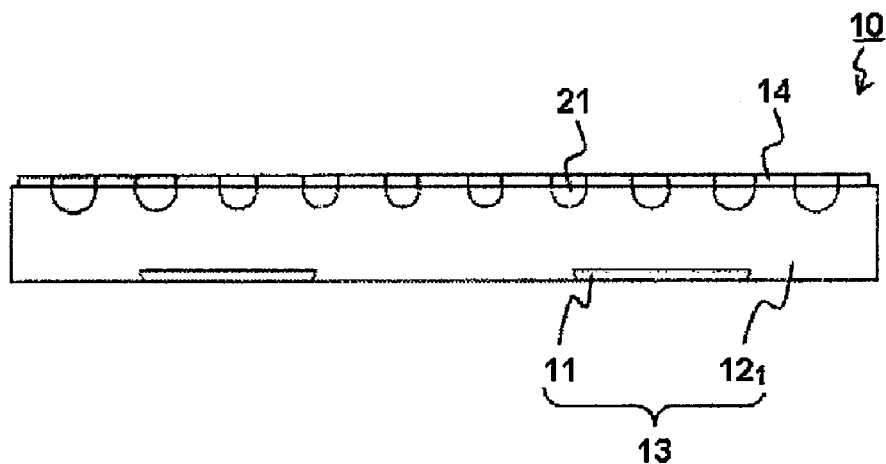
FIG. 1B is a side view of the surface lighting unit according to the first embodiment of the present invention.

FIG. 1B is a side view of the surface lighting unit according to the embodiment of the present invention.

This surface lighting unit 10 according to the first embodiment of the present invention includes: a casing 13 having a footprint portion 11 and sidewall portions $12_1$, $12_2$, $12_3$, $12_4$ standing from the footprint portion 11; and an optical reflector 14 spaced apart by a certain distance in the radiation direction of light from the footprint portion 11.

In other words, the surface lighting unit 10 is formed in a box shape as a whole. Inner surfaces of the footprint portion 11 and of the sidewall portions $12_1$, $12_2$, $12_3$, $12_4$ are reflective surfaces having the function to reflect light thereon. The surface of the optical reflector 14 that faces the footprint portion is also a reflective surface.

In the present embodiment, the size of the surface lighting unit 10 is a cuboid of 10 cm×10 cm×1.5 cm (height), for example. However, the size of the surface lighting unit 10 is not limited thereto.

Low light absorbent materials are used as material of the surface lighting unit 10. Specific examples include an ultrafinely foamed optical reflector, a substance obtained by emulsifying particulates of titanium white, and particulates of polytetrafluoroethylene (polyfluorocarbon), and a combination of these substances.

A surface lighting light source device employing the surface lighting unit 10 is configured by arranging a light source at the center of the footprint portion of the surface lighting unit 10. The surface lighting light source device will be described in greater detail later.

The optical reflector 14 has openings 15, such as grooves or holes, for adjusting the reflection of light (or the transmittance of light) emitted from the light source. The openings 15 are formed by cutting the optical reflector 14 with a cutting plotter or the like.

The geometry of the openings 15 will now be described.

Around the center of the optical reflector 14, a plurality of concentric circular non-through holes (half cuts) 16 centering on the center O of the optical reflector 14 are provided. The non-through holes 16 are grooves that are substantially half as deep as the optical reflector 14. The non-through holes 16 are used, with the optical reflector 14 incorporated in a surface lighting light source device, for adjusting the transmittance of light emitted from the light source of the surface lighting light source device to provide uniform illumination light. The cross section of the non-through holes 16 can be V-shaped, cornered-U-shaped, or any other suitable shape.

On the outer side of the non-through holes 16, a large number of concentric, non-continuous, and annular (circular-ring-shaped) narrow holes 17 are formed. The annular narrow holes 17 are formed in non-continuous annular patterns by connecting parts 18, i.e., in a plurality of arcuate patterns. The reason for making the annular holes non-continuous is that continuous annular holes detach the portion located on the center side of the narrow holes 17 from the optical reflector 14.

On the outer side of the narrow holes 17, a large number of concentric, non-continuous, and annular (circular-ring-shaped) holes 19 are formed in the same manner. The width of the annular holes 19 is larger than that of the narrow holes 17. Like the narrow holes 17, the annular holes 19 for providing uniform light are formed in non-continuous annular patterns by the connecting parts 18, i.e., in a plurality of arcuate patterns. The reason for making the annular holes non-continuous is that continuous annular holes detach the portion located on the center side of the holes 19 from the optical reflector 14.

On the outer side of the circular-ring-shaped holes 19, a large number of circular holes (round holes) $20_1$, $20_2$, ... $20_n$ are arranged in a closed-packed lattice in a plan view.

With the round holes 20 arranged in a closed-packed lattice and the annular holes 19 arranged on the center side of the optical reflector 14, the round holes 20 that are adjacent to the holes 19 are arranged in a hexagon ABCDEF indicated by the dotted line.

The respective vertexes of the hexagon ABCDEF indicated by the dotted line correspond to round holes $20_A$, $20_B$, $20_C$, $20_D$, $20_E$, $20_F$.

The holes 19 that are farthest from the center O of the optical reflector 14 are arranged on the straight lines joining the vertexes of the hexagon ABCDEF and the center O. In other words, no connecting parts 18 are located on the straight lines joining the vertexes of the hexagon ABCDEF and the center O.

For example, one hole $19_1$ of the holes 19 that are farthest from the center O is located on the straight line joining the vertex A and the center O.

Arranging the hole $19_1$ that is farthest from the center O on the straight line joining the vertex A and the center O makes the gap between the vertex A and the hole $19_1$ narrow. This makes it easy for light through the round hole $20_A$ and the hole $19_1$ to be incident on the upper portion between the vertex A and the hole $19_1$, which provides uniform illumination. In the same manner, the corresponding holes 19 are arranged near the other vertexes B, C, D, E, F.

Light emitted from the light source reflects at least once on the footprint portion 11, the sidewall portions 12, or the optical reflector 14 and passes through the openings 15. In other words, no light emitted from the light source directly passes through the openings 15. This configuration can provide uniform illumination light. In addition, light emitted from the light source can be used at high efficiency through reflection.

If light emitted from the light source directly passes through the openings 15, the flux of light that has passed the optical reflector 14 is too intense to make the distribution of light uniform at positions spaced apart by a certain distance in the radial direction of the light.

The round holes $20_1, 20_2, \ldots 20_n$ included in the openings 15 have uneven diameters. Their diameters vary depending on the distance from the center of the optical reflector 14 that lies facing the light source. The degree of variation will be described later with reference to FIG. 2.

The sidewall portions $12_1, 12_2, 12_3, 12_4$ of the surface lighting unit 10 have holes 21 (sidewall holes) communicating with the round holes 20 of the optical reflector 14.

Assuming that an opening ratio A is a ratio (the area of the openings in a preset region/reference area) of the area of the openings in the preset region to the area of the preset region (reference area), the openings 15, such as the arcuate holes and round holes, are formed to satisfy the formula:

$$A = bx^2 + c, \quad (1)$$

where A is the opening ratio, x is a distance from the center O of the optical reflector 14, and b and c are constants.

Figure 2:
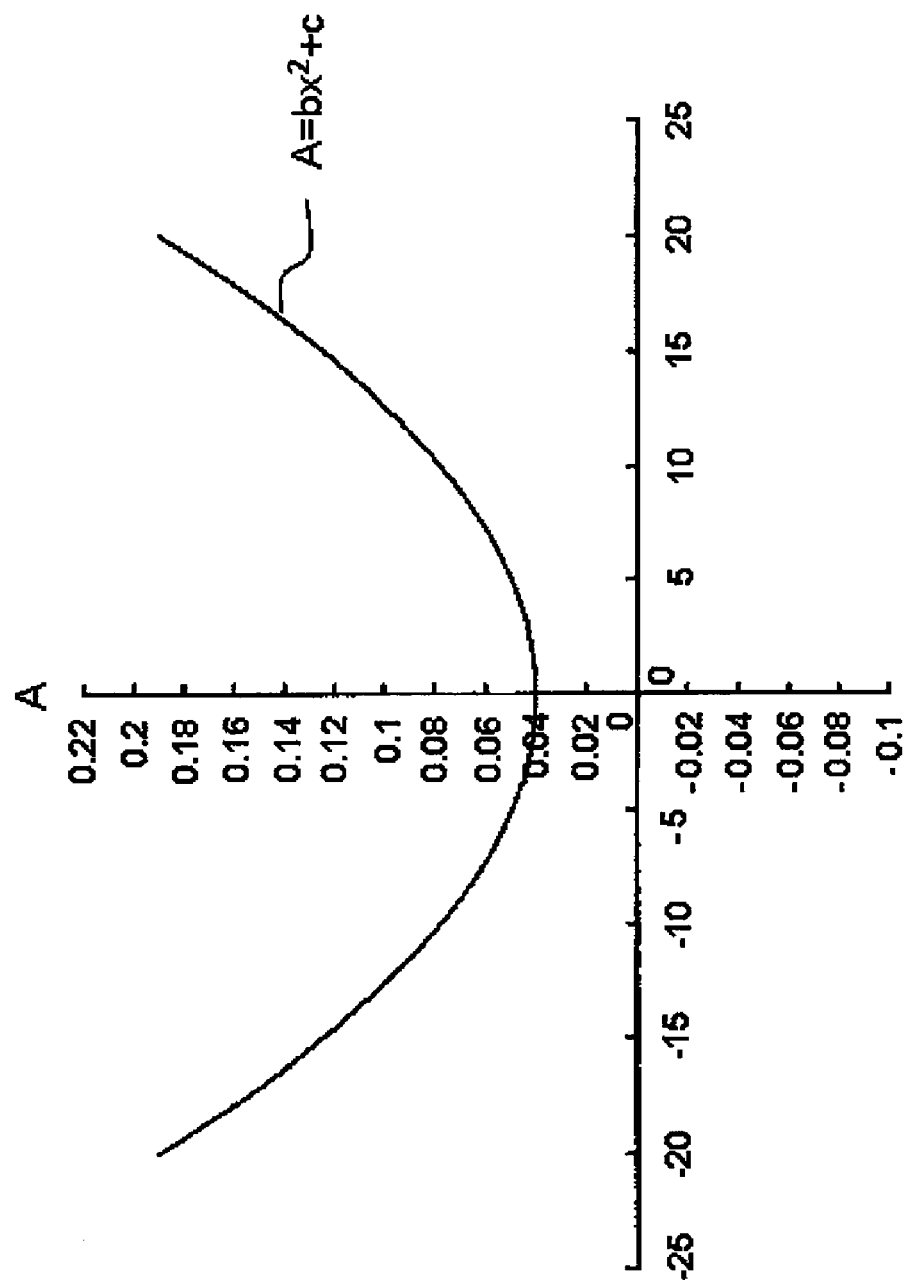
FIG. 2 is a chart illustrating the curve of the opening ratio of an optical reflector.

As illustrated in FIG. 2, a so-called quadratic curve is plotted with the horizontal axis indicating the distance x and the vertical axis indicating the opening ratio A. The opening ratio A being 1 means full opening.

Referring to FIG. 2, b is 0.000375 and c is 0.04 according to the present embodiment. Consequently, the opening ratio A is 0.04 if x is 0.

Referring to FIG. 2, as the distance from the center O of the optical reflector 14, which lies facing the light source, increases outward, the opening ratio A increases in proportion to the square of the distance. By making the center of the optical reflector 14, which is closer to the light source and is illuminated with intense light, have a small opening ratio and making peripheral regions illuminated with less intense light have a large opening ratio, uniform illumination can be provided. More specifically, the size (diameter) of the round holes 20 is designed to increase as the distance from the center O of the optical reflector 14 increases outward as illustrated in FIG. 1A.

According to the present embodiment, because the opening ratio A increases depending on the distance from the center O of the optical reflector 14, which lies facing the light source, uniform illumination light can be provided on a plane that is spaced apart by a certain distance (e.g., 5 mm) from the surface of the optical reflector 14 in the radial direction of the light.

The definition of the opening ratio A by the formula helps set the size of the openings 15 quantitatively. This facilitates the processing of the openings 15.

The openings 15 are formed sufficiently as long as they satisfy the relationship represented by Formula (1); therefore, the openings 15 can be composed of round holes 20 alone. In this case, the round holes 20 that are around the center of the optical reflector 14 have a smaller diameter. However, if a cutting plotter is used for forming round holes, round holes having a diameter at or below a certain threshold cannot be formed at all or cannot be properly formed, resulting in distorted round holes, with the cutting plotter.

In the present embodiment, therefore, the openings around the center of the optical reflector 14 are composed of arcuate holes, which facilitates forming of the openings.

With the surface lighting unit according to the present embodiment, the openings can be easily formed in forming the openings with a cutting plotter.

The relationship between the opening ratio A and the parameters of the holes will now be described.

Figure 3:
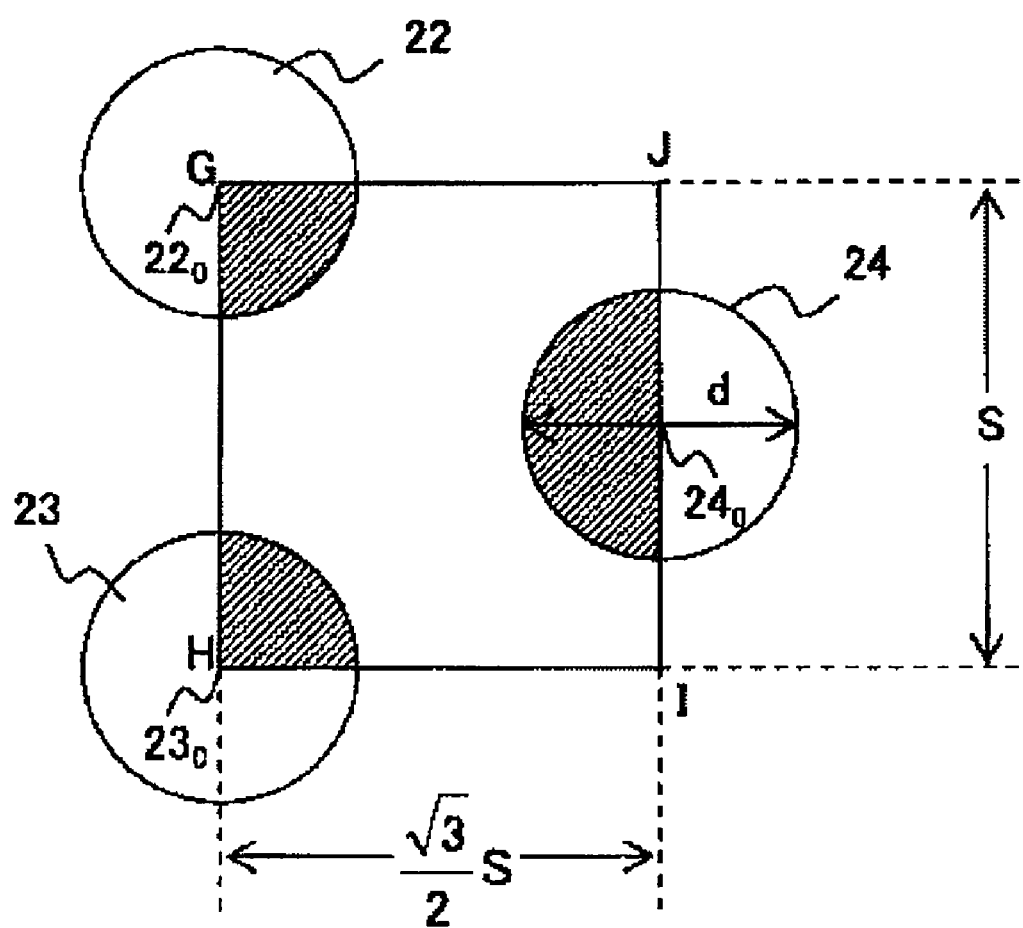
FIG. 3 is a chart illustrating the opening ratio of a round-hole portion.

FIG. 3 is an enlarged chart illustrating part of the round holes 20 in a peripheral region of the optical reflector 14 in FIG. 1A.

Round holes 22, 23, 24 are so arranged that an equilateral triangle is plotted by joining their centers.

The round holes 22, 23, 24 each have a diameter d. With the centers $22_O$ and $23_O$ of the round holes 22 and 23, respectively, serving as vertexes, and with a line drawn through the center $24_O$ of the round hole 24 serving as a side, a rectangle GHIJ is referred to as a certain region to define the opening ratio.

Supposing s denotes the distance between the centers of the round holes 22 and 23, the area of the rectangle GHIJ is calculated by:

[Formula 1]

$$s \cdot \frac{\sqrt{3}}{2} s = \frac{\sqrt{3}}{2} s^2. \quad (2)$$

The openings are calculated as a total of the semicircle and quarter sectors with diagonal lines. Therefore, the area of the openings equals the area of a circle having a diameter d, and represented by:

[Formula 2]

$$\frac{\pi}{4} d^2. \quad (3)$$

Therefore, the opening ratio A is calculated by:

[Formula 3]

$$A = \frac{\frac{\pi}{4} d^2}{\frac{\sqrt{3}}{2} s^2} = \frac{\pi d^2}{2\sqrt{3} s^2}, \quad (4)$$

and the diameter d is calculated by:

[Formula 4]

$$d = \sqrt{\frac{2\sqrt{3} A}{\pi}} \cdot s = \sqrt{1.10266 A} \cdot s. \quad (5)$$

The opening ratio A of the openings 15 of the optical reflector 14 is determined by Formula (1) mentioned above, and the diameter d of the round holes at the corresponding position is determined based on the determined opening ratio A and Formula (5).

Figure 4:
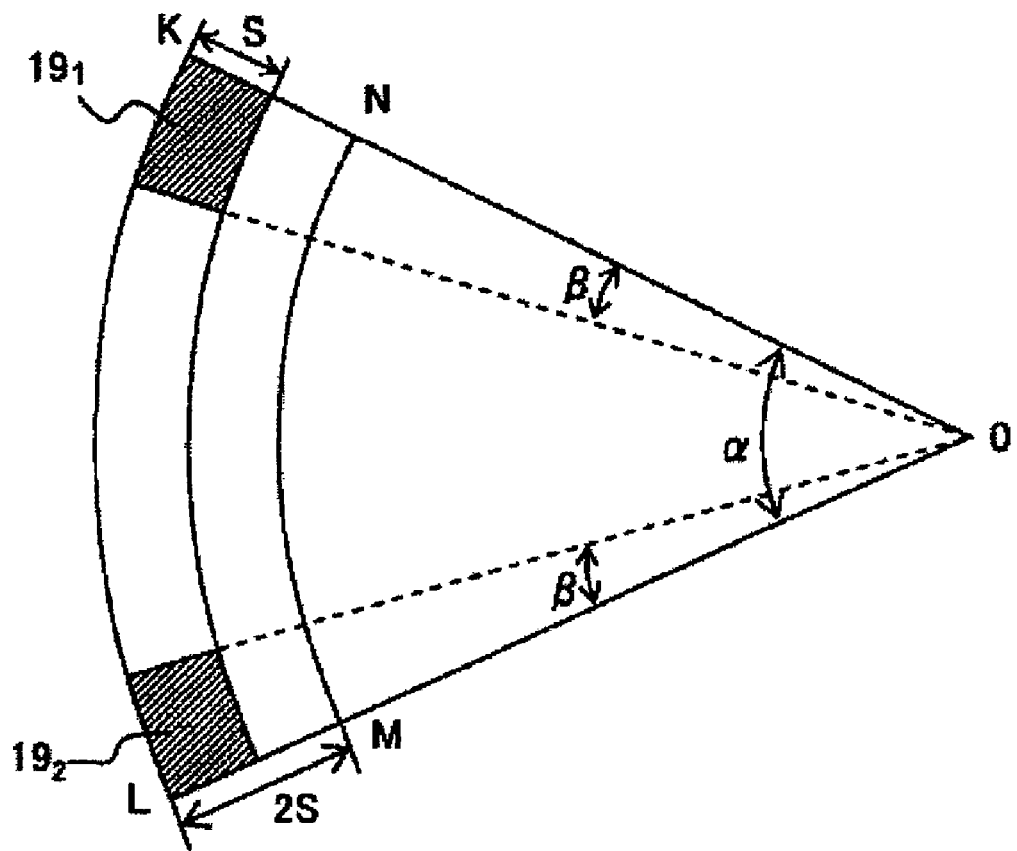
FIG. 4 is a chart illustrating the opening ratio of an arcuate-hole portion.

FIG. 4 is an enlarged chart illustrating the non-continuous annular holes (arcuate holes) 19 of the optical reflector 14.

Note that s denotes the width of the holes, α denotes the angle between two arcuate holes $19_1$, $19_2$, and β denotes the angle of each arcuate hole $19_1$, $19_2$.

A certain region is defined as an arc KLMN covering the arcuate holes $19_1$, $19_2$ and having a width 2s and an angle α.

The opening ratio A is calculated by:

[Formula 5]

$$A = \frac{2\beta \cdot s}{2s \cdot \alpha} = \frac{\beta}{\alpha}, \quad (6)$$

and the angle β of the arcuate holes is represented by:

[Formula 6]

$$\beta = \alpha A. \quad (7)$$

The opening ratio A of the openings 15 of the optical reflector 14 is determined by Formula (1) mentioned above, and the angle β of the arcuate holes at the corresponding position is determined based on the determined opening ratio A and Formula (7).

As for openings that are non-through holes, the area of the openings is calculated by multiplying the area of the non-through holes by 0.5.

Figure 5:
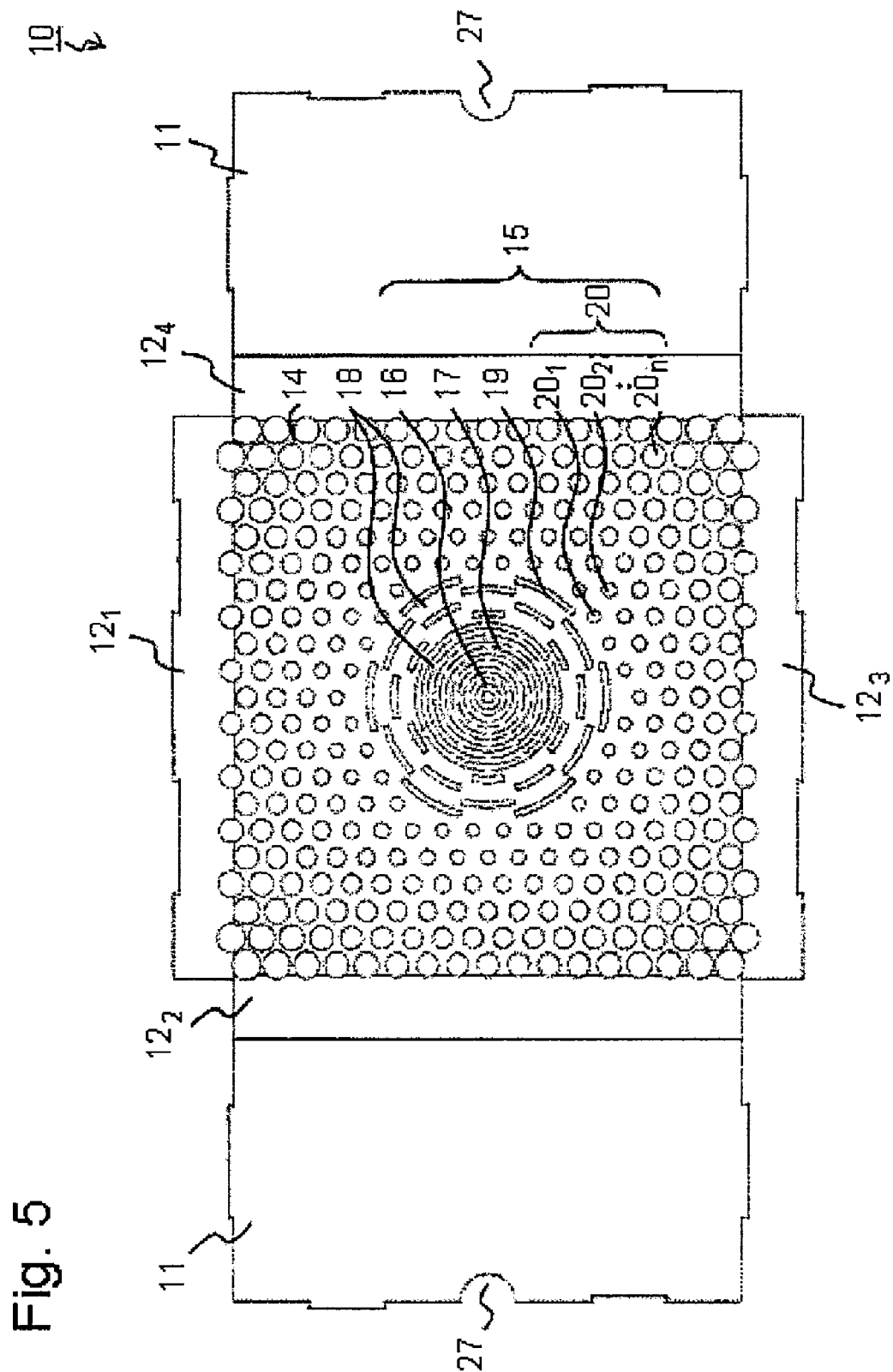
FIG. 5 is an unfolded view of the surface lighting unit according to the first embodiment of the present invention.

FIG. 5 is an unfolded view of the surface lighting unit according to the first embodiment of the present invention.

In the description below, as elements having the same reference numerals in the drawings are identical elements or elements exerting similar effects, the descriptions thereof may be omitted.

The surface lighting unit 10 according to the first embodiment includes, as described above, the footprint portion 11 and the sidewall portions $12_1$, $12_2$, $12_3$, $12_4$ all of which constitute the casing 13, and the optical reflector 14.

The surface lighting unit 10 is formed of a single plate, by folding the plate along the boundaries of the footprint portion 11, the sidewall portions $12_1$, $12_2$, $12_3$, $12_4$, and the optical reflector 14 to make the surface lighting unit 10. In other words, the surface lighting unit 10 in an unfolded state is on a single continuous plate.

The footprint portion 11 has a notch 25 forming a hole to place a light source substantially at the center of the footprint portion 11.

The surface lighting unit 10 according to the present embodiment is formed by folding a single plate punched out in a prescribed shape. The surface lighting unit 10 according to the present embodiment can therefore be manufactured easily and at a low cost.

Figure 6:
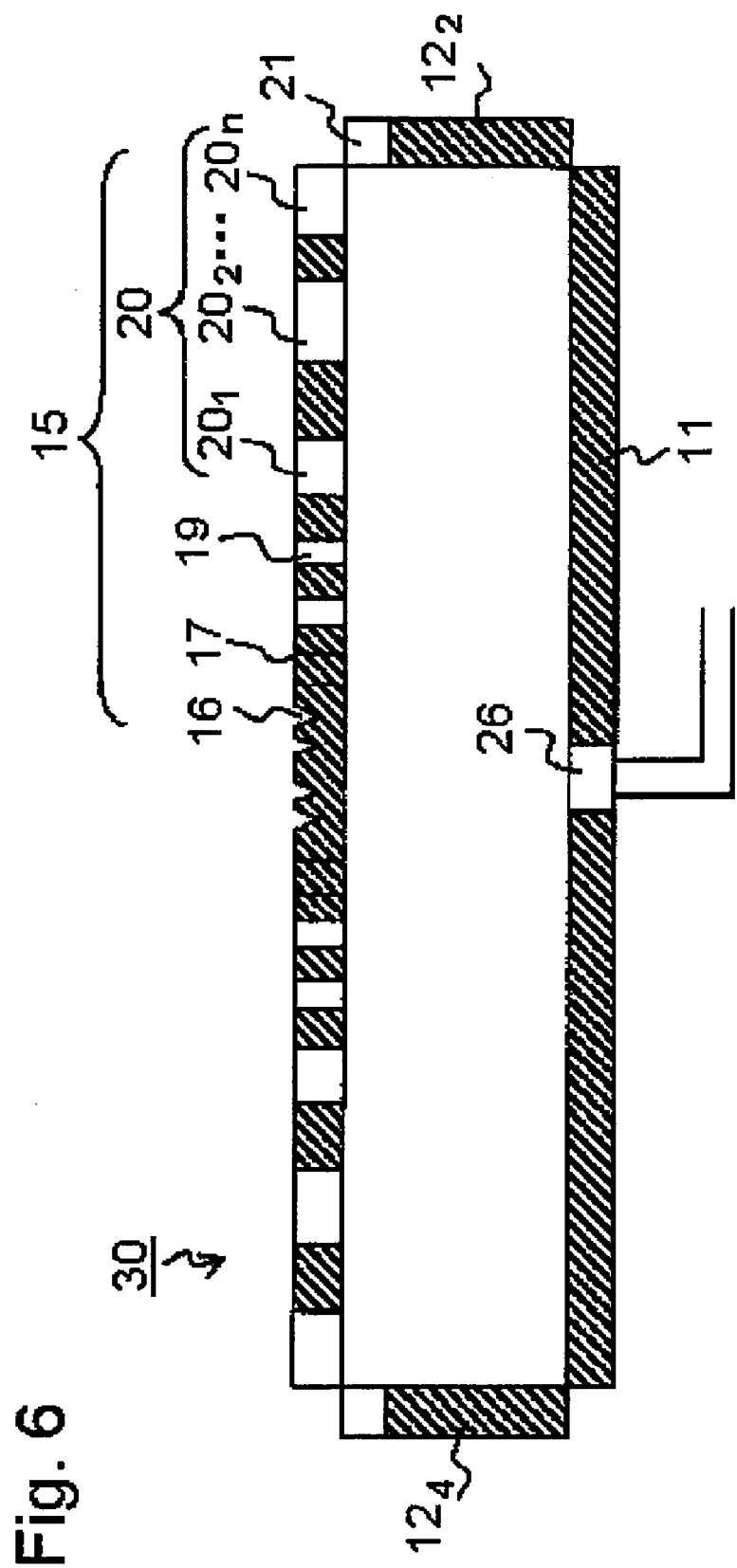
FIG. 6 is a sectional view of a surface lighting light source device employing the surface lighting unit according to the first embodiment of the present invention.

FIG. 6 is a sectional view of a surface lighting light source device employing the surface lighting unit according to the first embodiment of the present invention.

This surface lighting light source device 30 according to the present embodiment is configured by placing a group of light source 26 composed of a single element or an assembly of plural elements emitting light (e.g., LED) in a hole formed substantially at the center of the footprint portion 11 of the surface lighting unit 10.

The scope of the light source 26 includes not only elements that emit light from themselves such as LEDs or laser diodes (LDs), but also light guided by light guiding wires or the like. The light source 26 also includes not only point-light sources, such as LEDs and filament bulbs, but also linear light sources such as cold cathode tubes. Also, the light source 26 includes not only the case of a single light emitting element, but also cases in which a plurality of light emitting elements are arranged closely to one another as an assembly. Further, the light source 26 includes cases in which light emitting elements of the light's three primary colors of red, blue, and green are closely arranged.

Light emitted from the light source 26 reflects at least once on the footprint portion 11, the sidewall portions 12, or the optical reflector 14 and passes through the openings 15. The light is diffused and uniform illumination light can be provided as a result.

Figure 7:
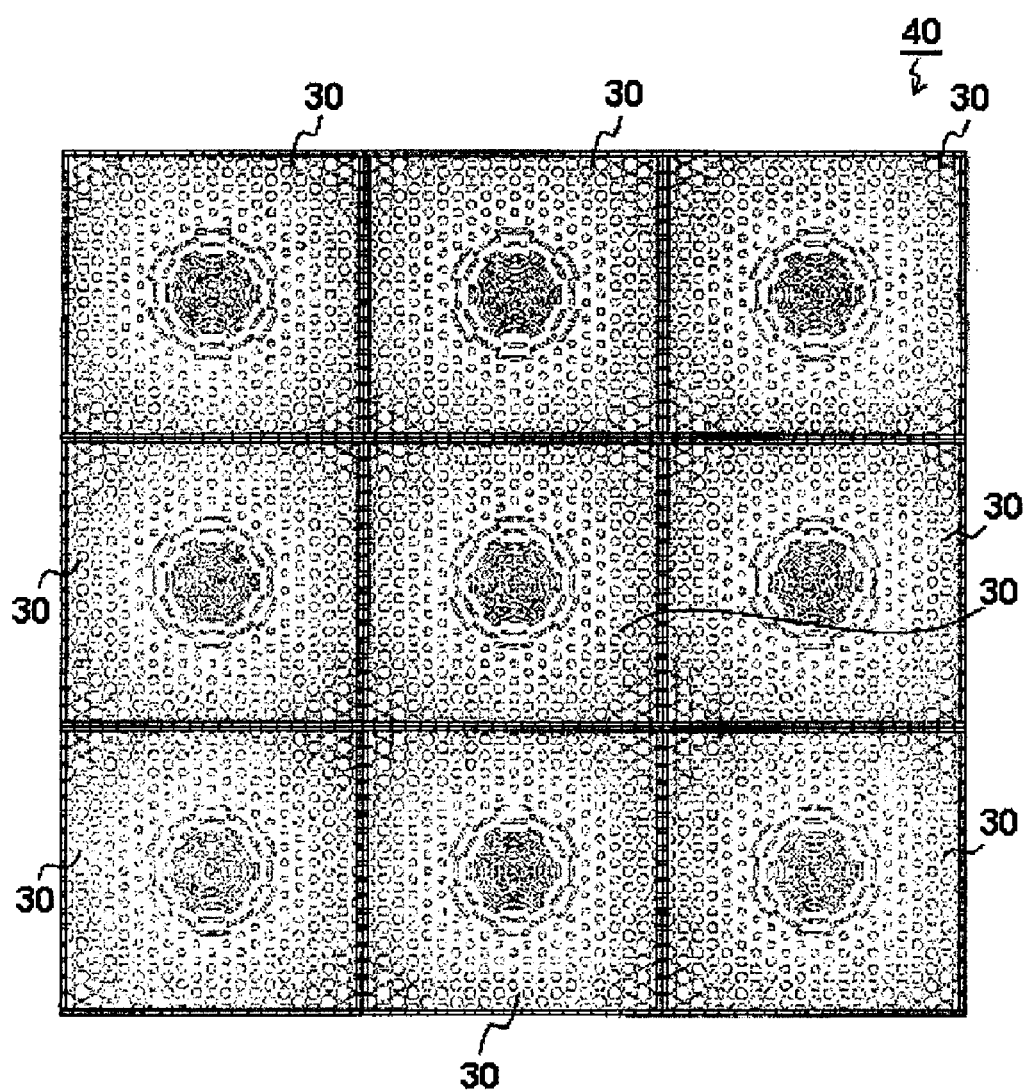
FIG. 7 is a plan view of a surface lighting device according to the first embodiment of the present invention.

FIG. 7 is a plan view of a surface lighting device employing the surface lighting unit according to the first embodiment of the present invention.

This surface lighting device 40 employing the surface lighting unit 30 is configured by arranging the surface lighting light source device 30 described above plurally in a matrix.

With the surface lighting device 40, a surface lighting device having a desired size can be configured by changing the number of surface lighting light source devices 30 employed. According to the present embodiment, three-by-three nine surface lighting light source devices 30 are employed to make the surface lighting device 40.

Figure 8:
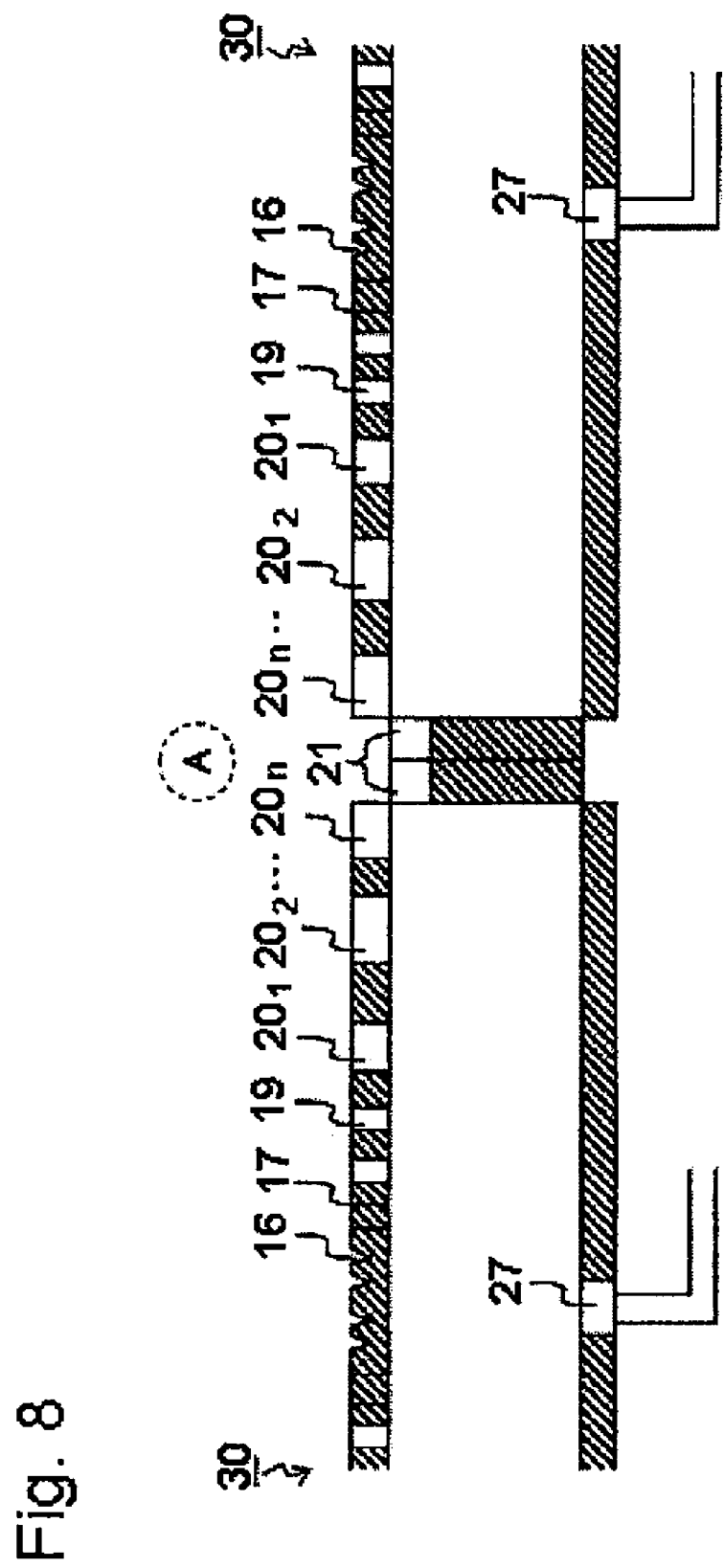
FIG. 8 is a partial sectional view of the surface lighting device according to the first embodiment of the present invention.

FIG. 8 is a partial sectional view of the surface lighting device employing the surface lighting unit according to the first embodiment of the present invention.

The surface lighting device 40 is configured by arranging surface lighting light source devices 30 each employing the surface lighting light source unit 10 plurally in a matrix. FIG. 8 is an enlarged sectional view of a boundary region of two surface lighting light source devices 30.

In conventional surface lighting devices, point A above a boundary region of surface lighting light source devices is a place on which light is hardly incident due to sidewall portions and thus the place remains dark. Consequently, uniform illumination is not available.

By contrast, in the surface lighting unit 10 according to the present embodiment, the sidewall portions $12_1$, $12_2$, $12_3$, $12_4$ have the holes 21 (sidewall holes) communicating with the round holes 20 of the optical reflector 14. Thanks to the light that has passed through the sidewall holes 21, sufficient light is provided above the sidewall portions $12_1$, $12_2$, $12_3$, $12_4$, and thoroughly uniform illumination light can be provided.

Figure 9:
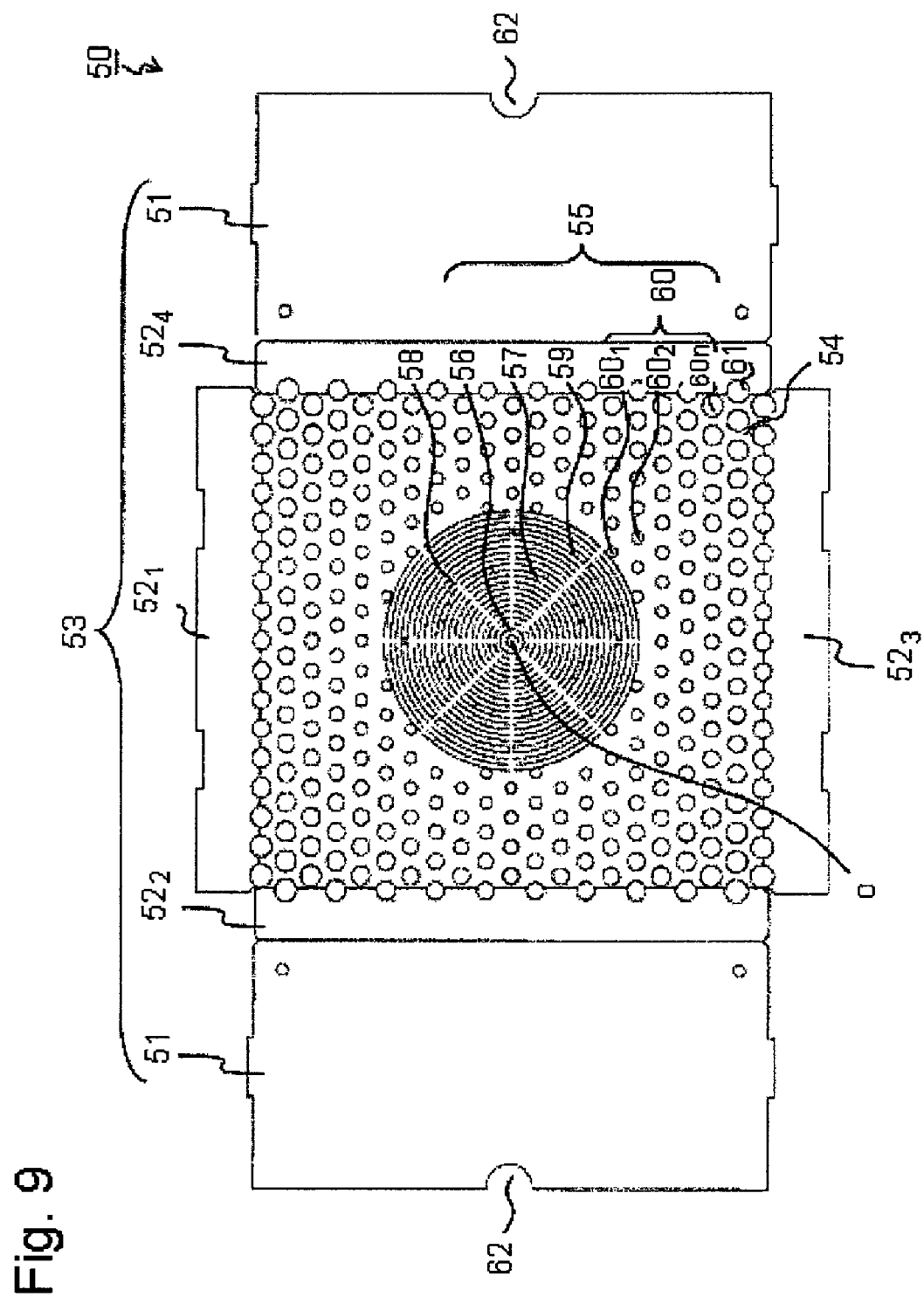
FIG. 9 is an unfolded view of a surface lighting unit according to a second embodiment of the present invention.

FIG. 9 is an unfolded view of a surface lighting unit according to a second embodiment of the present invention.

This surface lighting unit 50 according to the second embodiment includes, like the surface lighting unit according to the first embodiment, a footprint portion 51 and sidewall portions $52_1$, $52_2$, $52_3$, $52_4$ all of which constitute a casing 53, and an optical reflector 54. The footprint portion 51 has a notch 62 for forming a hole to place a light source substantially at the center thereof.

The surface lighting unit 50 is formed of a single plate, by folding the plate along the boundaries of the footprint portion 51, the sidewall portions $52_1$, $52_2$, $52_3$, $52_4$, and the optical reflector 54 to make the surface lighting unit 50 in a cube.

The surface lighting unit 50 according to the second embodiment differs from the surface lighting unit 10 according to the first embodiment in the patterns of openings 55 of the optical reflector 54.

The openings 55 include non-through holes 56, narrow holes 57, holes 59, and round holes 60.

Around the center of the optical reflector 54, a plurality of concentric circular non-through holes 56 centering on the center O of the optical reflector 54 are provided.

On the outer side of the non-through holes 56, a large number of concentric, non-continuous, and annular (circularring-shaped) narrow holes 57 are formed. The annular narrow holes 57 are formed in non-continuous annular patterns by connecting parts 58, i.e., in a plurality of arcuate patterns.

Between the narrow holes 57, a large number of concentric, non-continuous, and annular (circular-ring-shaped) holes 59 are formed in the same manner. The width of the circular-ring-shaped holes 59 is larger than that of the narrow holes 57. Like the narrow holes 57, the circular-ring-shaped holes 59 are formed in non-continuous annular patterns by the connecting parts 58, i.e., in a plurality of arcuate patterns.

On the outer side of the circular-ring-shaped holes 59, a large number of round holes (through holes) $60_1, 60_2, \ldots 60_n$ are arranged axisymmetrically about the center O of the optical reflector 54.

Further, the sidewall portions $52_1, 52_2, 52_3, 52_4$ of the surface lighting unit 50 have holes 61 (sidewall holes) communicating with the round holes 60 of the optical reflector 54.

Figure 10:
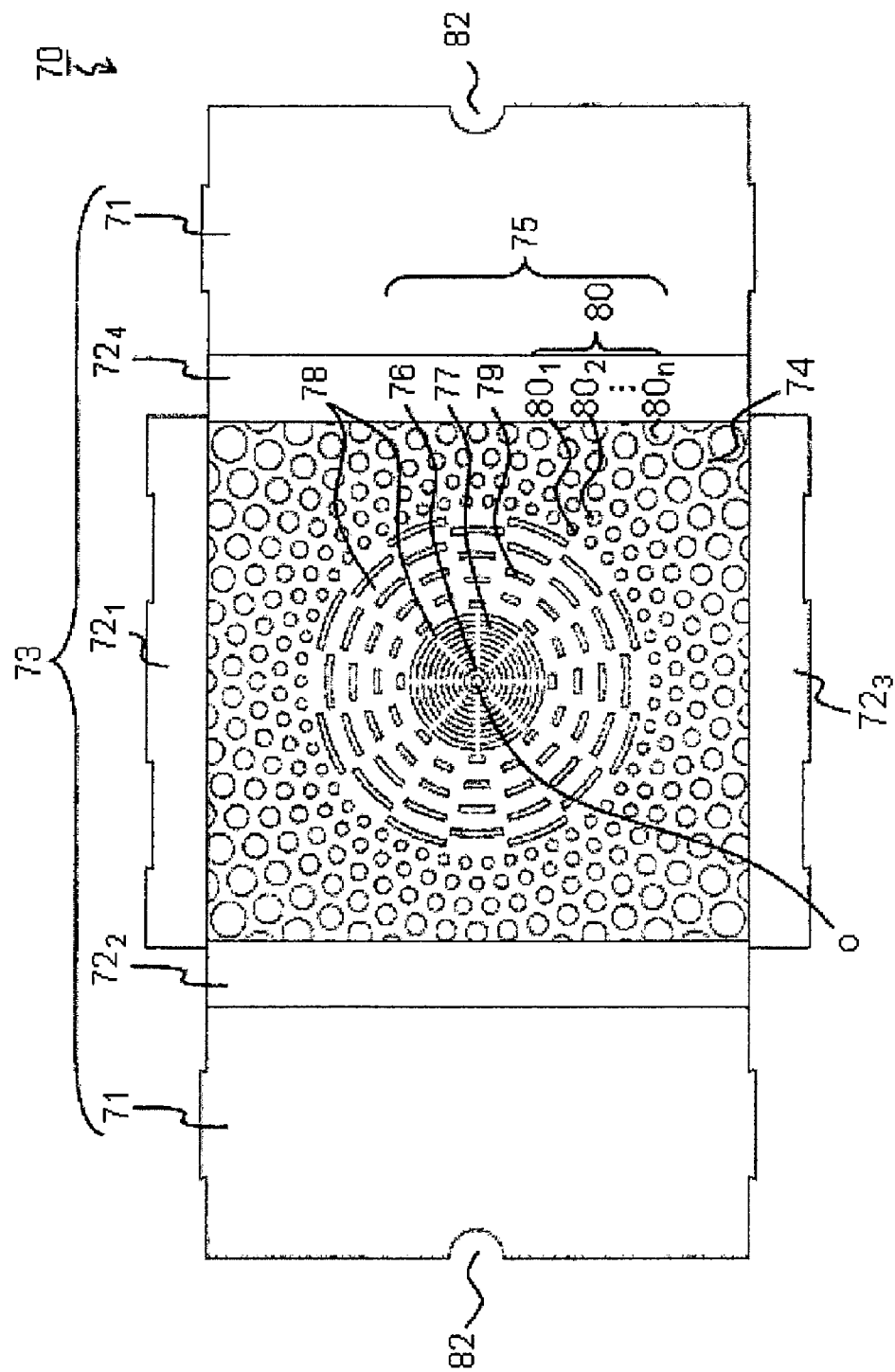
FIG. 10 is an unfolded view of a surface lighting unit according to a third embodiment of the present invention.

FIG. 10 is an unfolded view of a surface lighting unit according to a third embodiment of the present invention.

This surface lighting unit 70 according to the third embodiment includes, like the surface lighting unit according to the first embodiment, a footprint portion 71 and sidewall portions $72_1, 72_2, 72_3, 72_4$ all of which constitute a casing 73, and an optical reflector 74. The footprint portion 71 has a notch 82 for forming a hole to place a light source substantially at the center thereof.

The surface lighting unit 70 is formed of a single plate, by folding the plate along the boundaries of the footprint portion 71, the sidewall portions $72_1, 72_2, 72_3, 72_4$, and the optical reflector 74 to make the surface lighting unit 70 in a cuboid.

The surface lighting unit 70 according to the third embodiment differs from the surface lighting unit 10 according to the first embodiment in the patterns of openings 75 of the optical reflector 74.

The openings 75 include non-through holes 76, narrow holes 77, holes 79, and round holes 80.

Around the center of the optical reflector 74, a plurality of concentric circular non-through holes 76 centering on the center O of the optical reflector 74 are provided.

On the outer side of the non-through holes 76, a large number of concentric, non-continuous, and annular (circular-ring-shaped) narrow holes 77 are formed. The annular narrow holes 77 are formed in non-continuous annular patterns by connecting parts 78, i.e., in a plurality of arcuate patterns.

On the outer side of the narrow holes 77, a large number of concentric, non-continuous, and annular (circular-ring-shaped) holes 79 are formed in the same manner. The width of the circular-ring-shaped holes 79 is larger than that of the narrow holes 77. Like the narrow holes 77, the circular-ring-shaped holes 79 are formed in non-continuous annular patterns by the connecting parts 78, i.e., in a plurality of arcuate patterns.

On the outer side of the circular-ring-shaped holes 79, a large number of round holes (through holes) $80_1, 80_2, \ldots 80_n$ are arranged radially about the center O of the optical reflector 74.

While the embodiments of the present invention have been described, it should be noted that the present invention is not limited thereto, and various configurations can be employed without departing from the scope of the invention.

The invention claimed is:

1. A surface lighting unit plurally arranged in a matrix on a single plane, the unit comprising:
a box-shaped casing having a footprint portion in which a hole for placing a highly directional point-light source is formed at the center thereof and sidewall portions standing from the footprint portion; and
an optical reflector spaced apart by a certain distance from the footprint portion and having openings, wherein
the surface lighting unit is used in such a manner that the point-light source is placed in the hole,
inner surfaces of the footprint portion and of the sidewall portions, and an inner surface of the optical reflector that faces the footprint portion are reflective surfaces,
the optical reflector has a center thereof facing the hole,
the openings are so formed that an opening ratio represented by a ratio of the area of the openings in a preset region on the optical reflector to the area of the preset region increases as a distance from the center of the optical reflector increases outward, and
the sidewall portions have sidewall holes formed to satisfy the opening ratio, and
wherein the openings are formed in a non-through hole around the center of the optical reflector, in a plurality of non-continuous arcuate holes on the outer side of the non-through hole, and in a plurality of through holes on the outer side of the arcuate holes.

2. The surface lighting unit according to claim 1, wherein the following formula holds true:

$$A = bx^2 + c,$$

where A is the opening ratio, b and c are constants, and x is the distance from the center of the optical reflector.

3. A surface lighting light source device comprising:
a surface lighting unit plurally arranged in a matrix on a single plane, the unit including:
a box-shaped casing having a footprint portion in which a hole for placing a highly directional point-light source is formed at the center thereof and sidewall portions standing from the footprint portion; and
an optical reflector spaced apart by a certain distance from the footprint portion and having openings,
the surface lighting unit being used in such a manner that the point-light source is placed in the hole,
inner surfaces of the footprint portion and of the sidewall portions, and an inner surface of the optical reflector that faces the footprint portion being reflective surfaces,
the optical reflector having a center thereof facing the point-light source,
the openings being so formed that an opening ratio represented by a ratio of the area of the openings in a preset region on the optical reflector to the area of the preset region increases as a distance from the center of the optical reflector increases outward, and the sidewall portions having sidewall holes formed to satisfy the opening ratio;
the highly directional point-light source placed in the hole, and
wherein the openings are formed in a non-through hole around the center of the optical reflector, in a plurality of non-continuous arcuate holes on the outer side of the non-through hole, and in a plurality of through holes on the outer side of the arcuate holes.

4. A surface lighting device, wherein a surface lighting light source device is plurally arranged in a matrix,
the surface lighting light source device comprising:
a surface lighting unit including:
a box-shaped casing having a footprint portion in which a hole for placing a highly directional point-light source is formed at the center thereof and sidewall portions standing from the footprint portion; and
an optical reflector spaced apart by a certain distance from the footprint portion and having openings, the surface lighting unit being used in such a manner that the point-light source is placed in the hole, inner surfaces of the footprint portion and of the sidewall portions, and an inner surface of the optical reflector that faces the footprint portion being reflective surfaces, the optical reflector having a center thereof facing the point-light source, the openings being so formed that an opening ratio represented by a ratio of the area of the openings in a preset region on the optical reflector to the area of the preset region increases as a distance from the center of the optical reflector increases outward, and the sidewall portions having sidewall holes formed to satisfy the opening ratio;

the highly directional point-light source placed in the hole, and wherein the openings are formed in a non-through hole around the center of the optical reflector, in a plurality of non-continuous arcuate holes on the outer side of the non-through hole, and in a plurality of through holes on the outer side of the arcuate holes.

* * * * *